(12) United States Patent
Yang et al.

(10) Patent No.: US 9,205,523 B2
(45) Date of Patent: Dec. 8, 2015

(54) POSITIONING APPARATUS

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Chao Shen, Jiashan (CN); Jie Ni, Jiashan (CN); Qiang-Wei Wang, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/482,478

(22) Filed: Sep. 10, 2014

(65) Prior Publication Data

US 2015/0076306 A1 Mar. 19, 2015

(30) Foreign Application Priority Data

Sep. 16, 2013 (CN) ...................... 2013 2 0570444 U

(51) Int. Cl.
| | |
|---|---|
| A47B 91/00 | (2006.01) |
| B23Q 3/18 | (2006.01) |
| B25B 5/00 | (2006.01) |
| B25B 5/12 | (2006.01) |
| B25B 11/02 | (2006.01) |

(52) U.S. Cl.
CPC . *B23Q 3/18* (2013.01); *B25B 5/003* (2013.01); *B25B 5/006* (2013.01); *B25B 5/12* (2013.01); *B25B 5/122* (2013.01); *B25B 11/02* (2013.01)

(58) Field of Classification Search
CPC ............ B23Q 3/18; B23Q 3/069; B23Q 3/02; B25B 5/003; B25B 5/12; B25B 5/122; B25B 11/02; B25B 5/166
See application file for complete search history.

(56) References Cited

U.S. PATENT DOCUMENTS

| | | | | | |
|---|---|---|---|---|---|
| 5,173,029 | A | * | 12/1992 | Delventhal et al. ............ | 414/754 |
| 5,931,726 | A | * | 8/1999 | Peters ............................ | 451/305 |
| 6,364,302 | B2 | * | 4/2002 | Ausilio .......................... | 269/32 |
| 7,377,503 | B2 | * | 5/2008 | Yajima et al. ................... | 269/152 |

* cited by examiner

*Primary Examiner* — Amy Sterling
(74) *Attorney, Agent, or Firm* — Novak Druce Connolly Bove + Quigg LLP

(57) ABSTRACT

A positioning apparatus includes a mounting plate, a driving assembly, and two first position assemblies. The mounting plate defines a first guiding groove. The driving assembly is mounted on the mounting plate and includes a driver, and a transfer rod coupled to the driver. The first pivoting assembly includes a first coupling rod and a second coupling rod. The first coupling rod is movably received in the first guiding groove and pivotably coupled to the transfer rod. The second coupling rod is movably received in the first guiding groove and pivotably coupled to the transfer rod. The first position assemblies are respectively pivotably coupled to the first coupling rod and the second coupling rod.

20 Claims, 5 Drawing Sheets

POSITIONING APPARATUS

FIELD

The subject matter herein generally relates to positioning apparatuses, and particularly to a positioning apparatus configured to position a workpiece in more than one dimension.

BACKGROUND

When a workpiece is machined or assembled, a positioning apparatus can be used to position the workpiece. The positioning apparatus can include a driver and a position member coupled to the driver. The driver can drive the position member to position the workpiece.

BRIEF DESCRIPTION OF THE DRAWINGS

Implementations of the present technology will now be described, by way of example only, with reference to the attached figures.

DETAILED DESCRIPTION

Figure 1:
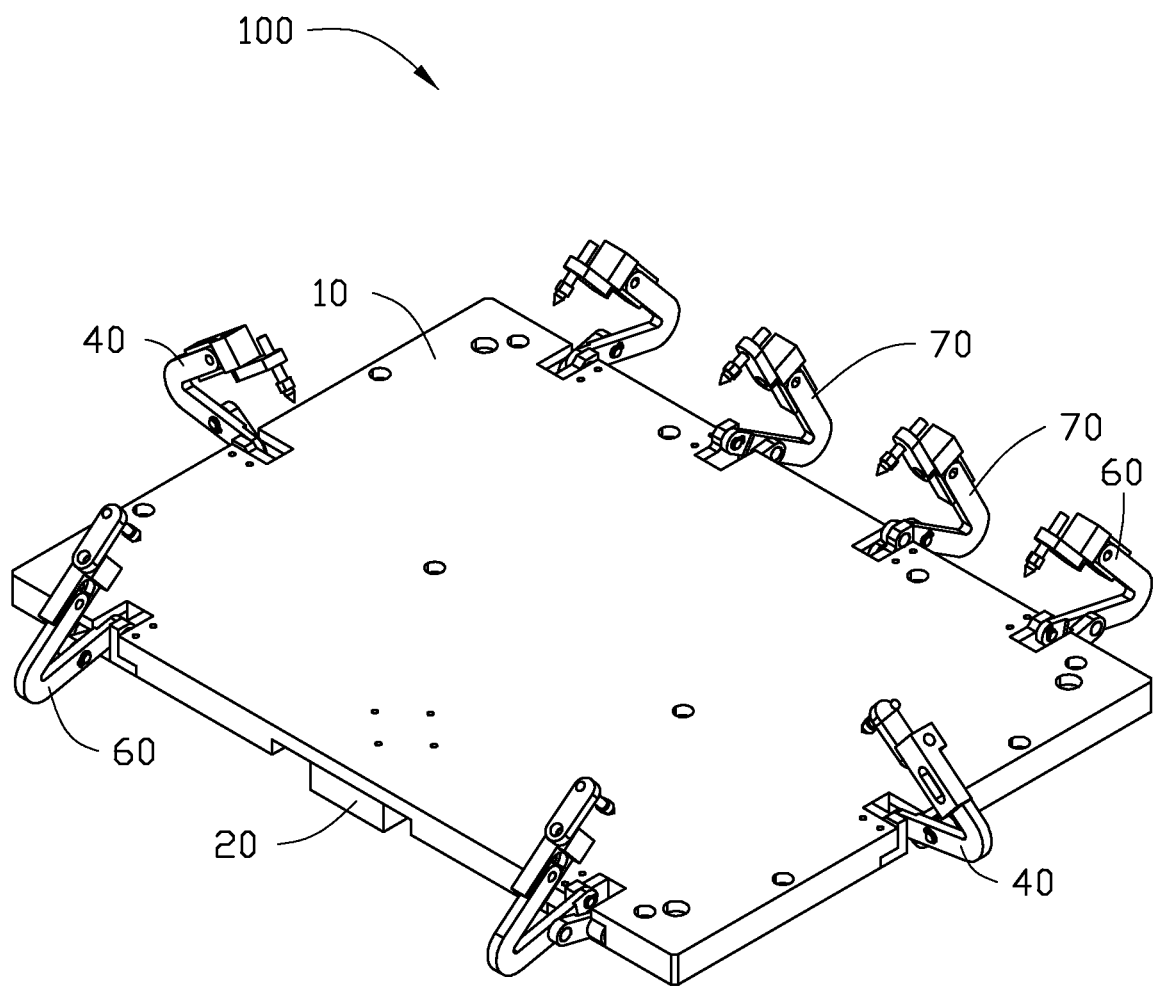
FIG. 1 is an isometric view of an embodiment of a positioning apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a positioning apparatus that can include a mounting plate, a driving assembly, a first pivoting assembly, and two first position assemblies. The mounting plate can define a first guiding groove. The driving assembly can be mounted on the mounting plate and include a driver and a transfer rod coupled to the driver. The first pivoting assembly can include a first coupling rod, a second coupling rod, a third coupling rod, and a fourth coupling rod. The first coupling rod can be movably received in the first guiding groove. The second coupling rod can be movably received in the first guiding groove. The first coupling rod and the second coupling rod can be respectively positioned at opposite sides of the transfer rod. The third coupling rod can be pivotably coupled to the first coupling rod and the transfer rod. The fourth coupling rod can be pivotably coupled to the second coupling rod and the transfer rod. The first position assemblies can be respectively pivotably coupled to the first coupling rod and the second coupling rod. Each first position assembly can include a first transfer rod, a second transfer rod pivotably coupled to the first transfer rod and the mounting plate, and a positioning member coupled to the second transfer rod. The first transfer rod of one of the first position assemblies can be pivotably coupled to the first coupling rod. The first transfer rod of another one of the first position assemblies can be pivotably coupled to the second coupling rod.

The present disclosure is further in relation to a positioning apparatus that can include a mounting plate, a driving assembly, and two first position assemblies. The mounting plate can define a first guiding groove. The driving assembly can be mounted on the mounting plate and include a driver, and a transfer rod coupled to the driver. The first pivoting assembly can include a first coupling rod and a second coupling rod. The first coupling rod can be movably received in the first guiding groove and pivotably coupled to the transfer rod. The second coupling rod can be movably received in the first guiding groove and pivotably coupled to the transfer rod. The first position assemblies can be respectively pivotably coupled to the first coupling rod and the second coupling rod.

FIG. 1 illustrates an embodiment of a positioning apparatus 100. The positioning apparatus 100 can include a mounting plate 10, a driving assembly 20, a first pivoting assembly 30 (shown in FIG. 3), two first position assemblies 40, two second pivoting assemblies 50 (shown in FIG. 3), four second position assemblies 60, and two third position assemblies 70.

Figure 2:
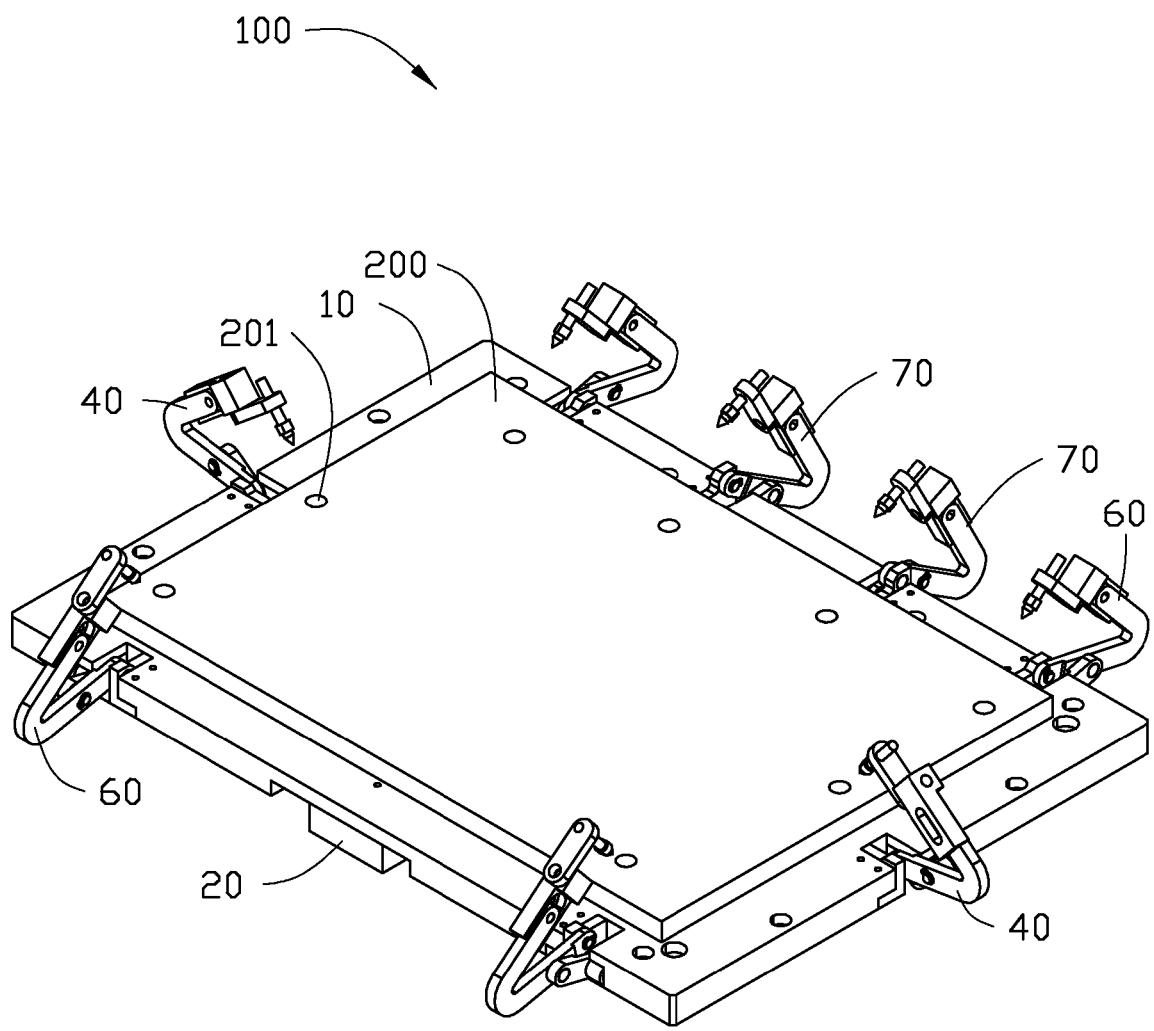
FIG. 2 is an isometric view of the positioning apparatus of FIG. 1 in a state of use.

FIG. 2 illustrates that the positioning apparatus 100 can be configured to position a workpiece 200. The workpiece 200 can define a plurality of position holes 201 corresponding to the first position assemblies 40, the second position assemblies 60, and the third position assemblies 70.

Figure 3:
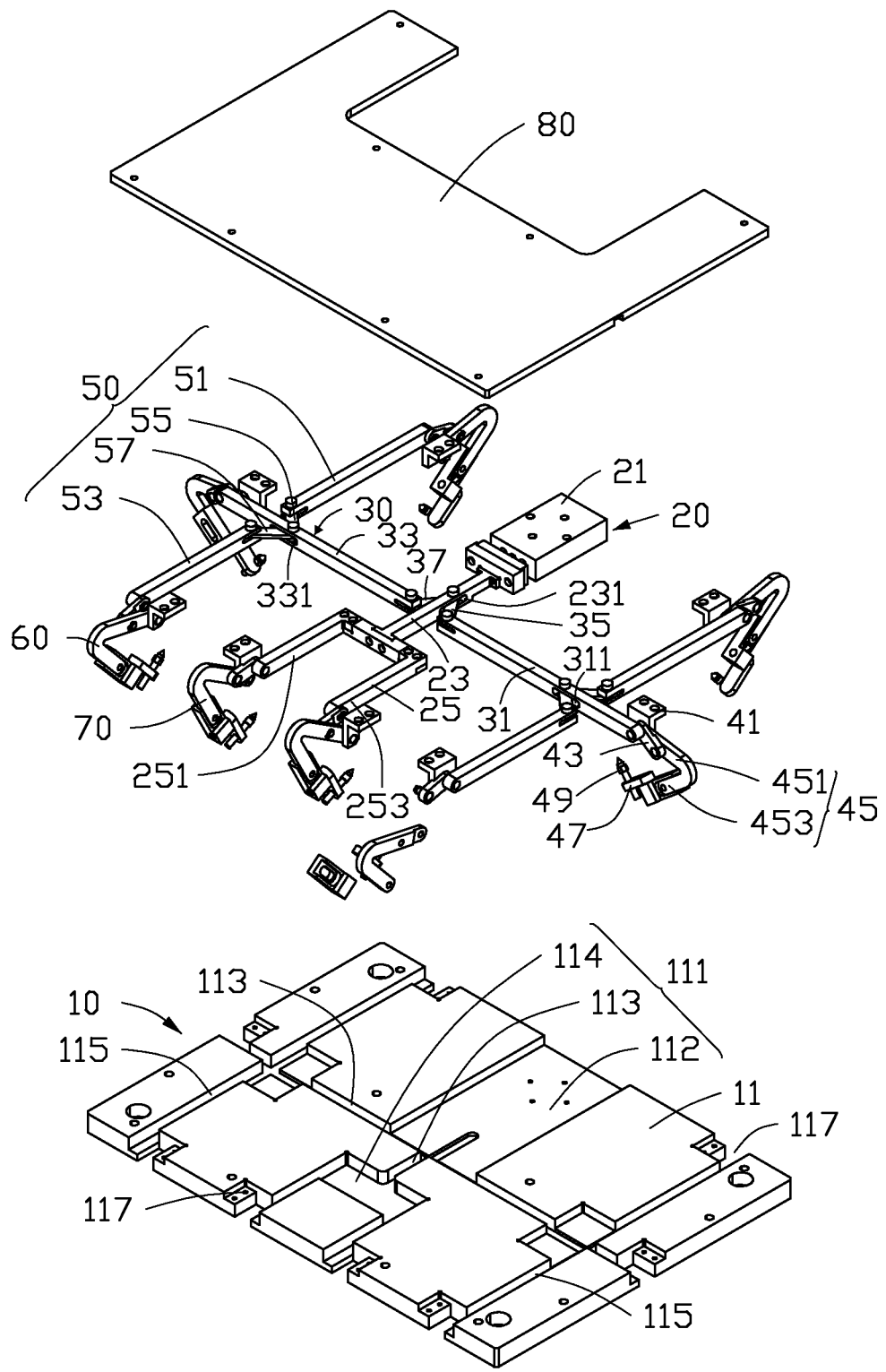
FIG. 3 is an exploded, isometric view of the positioning apparatus of FIG. 1.

FIG. 3 illustrates that the driving assembly 20 can be mounted on the mounting plate 10. The first pivoting assembly 30 can be pivotably coupled to the driving assembly 20. The first position assemblies 40 can be respectively pivotably coupled to the first pivoting assembly 30. The second pivoting assemblies 50 can be pivotably coupled to the first pivoting assembly 30. Each two second position assemblies 60 can be pivotably coupled to one of the second pivoting assemblies 50. The third position assemblies 70 can be coupled to the driving assembly 20. The driving assembly 20 can be configured to move the first position assemblies 40 via the first pivoting assembly 30 to position the workpiece 200. The driving assembly 20 can be further configured to move the second position assemblies 60 via the first pivoting assembly 30 and the second pivoting assemblies 50 to position the workpiece 200. The driving assembly 20 can be further configured to directly drive the third position assemblies 70 to position the workpiece 200.

The mounting plate 10 can be substantially in a shape of a rectangular plate and include a first mounting surface 11 and a second mounting surface 13 parallel and opposite to the first mounting surface 11. The first mounting surface 11 can define a first receiving groove 111, a first guiding groove 113, two second guiding grooves 115, and eight second receiving grooves 117.

The first receiving groove 111 can be configured to receive the driving assembly 20 and arranged along a lateral direction of the mounting plate 10. The first receiving groove 111 can include a first receiving portion 1112, a second receiving portion 1113, and a third receiving portion 1114 arranged in order. The second receiving portion 1113 can be positioned between the first receiving portion 1112 and the third receiving portion 1114. The second receiving portion 1113 can communicate with the first receiving portion 1112 and the third receiving portion 1114.

The first receiving portion 1112 can be substantially in a shape of rectangular. The first receiving portion 1112 can extend from an edge of the first mounting surface 11 to substantially a center of the first mounting surface 11. The second receiving portion 1113 can be substantially in a shape of a stripe and positioned in a substantially center of the first mounting surface 11. The third receiving portion 1114 can be substantially U-shaped and communicate with an end portion of the second receiving portion 1113 away from the first receiving portion 1112.

The first guiding groove 113 can be substantially in a shape of a stripe and arranged along a longitudinal direction of the mounting plate 10. The first guiding groove 113 can cross over the second receiving portion 1113 of the first receiving groove 111 and substantially perpendicular to the second receiving portion 1113. The first guiding groove 113 can be configured to receive the first pivoting assembly 30. Each second guiding groove 115 can be substantially in a shape of a stripe and configured to receive the corresponding second pivoting assembly 50. Each second guiding groove 115 can arranged along the lateral direction of the mounting plate 10 and cross over the first guiding groove 113. The second guiding grooves 115 can be defined at opposite sides of the second receiving portion 1113 of the first receiving groove 111 and both parallel to the second receiving portion 1113.

The second receiving grooves 117 can be arranged at edges of the mounting plate 10 and both run through the first mounting surface 11 and the second mounting surface 13. Two of the second receiving grooves 117 can be respectively arranged at opposite ends of the first guiding groove 113 and configured to partly receive the corresponding first position assembly 40. Four of the second receiving grooves 117 can be respectively arranged at opposite ends of the second guiding grooves 115 and configured to receive a part of the corresponding second position assembly 60. Another two of the second receiving grooves 117 can be arranged at opposite ends of the third receiving portion 1114 and configured to receive a part of the corresponding third position assembly 70.

Figure 4:
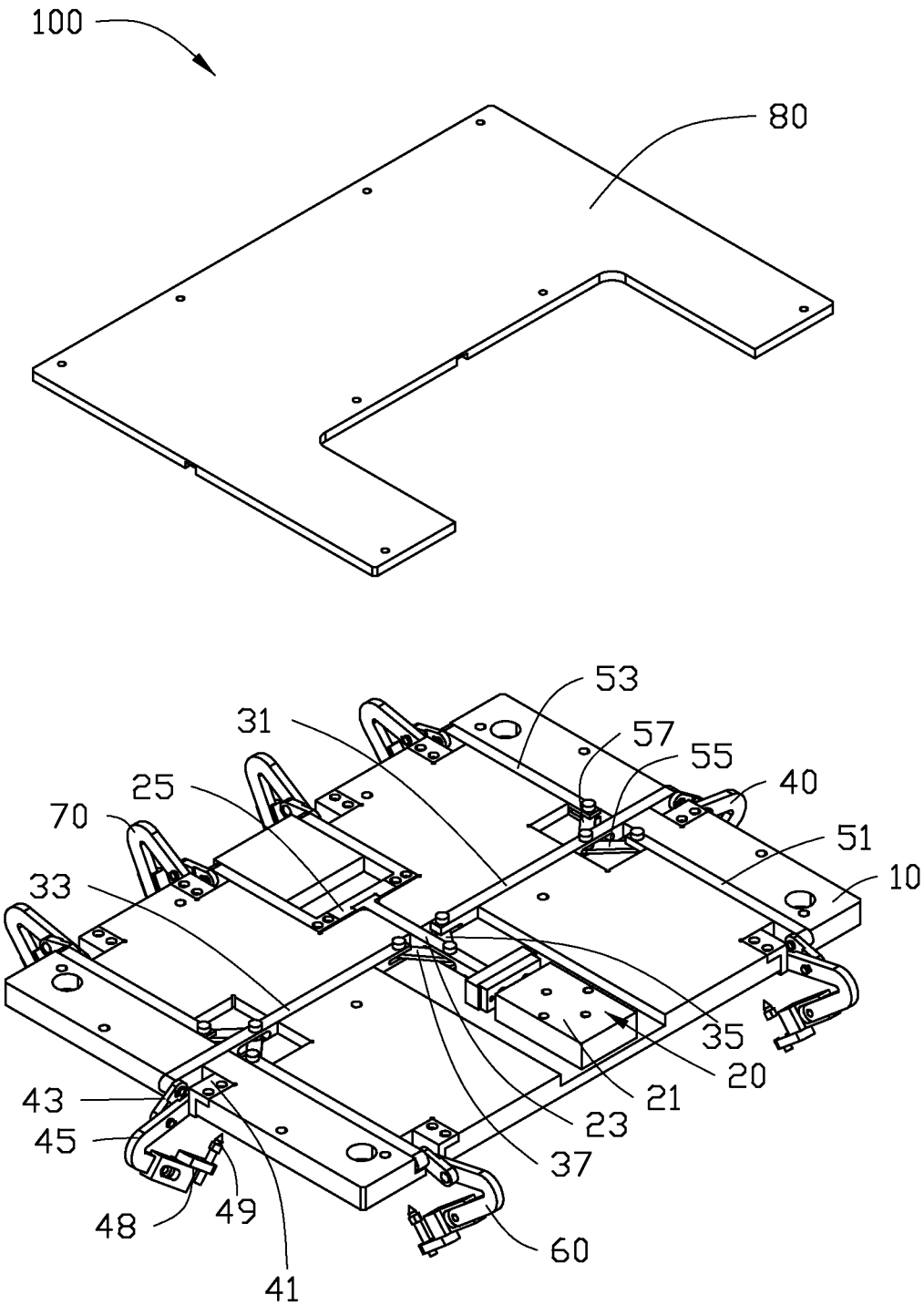
FIG. 4 is a partially exploded, isometric view of the positioning apparatus of FIG. 1.
Figure 5:
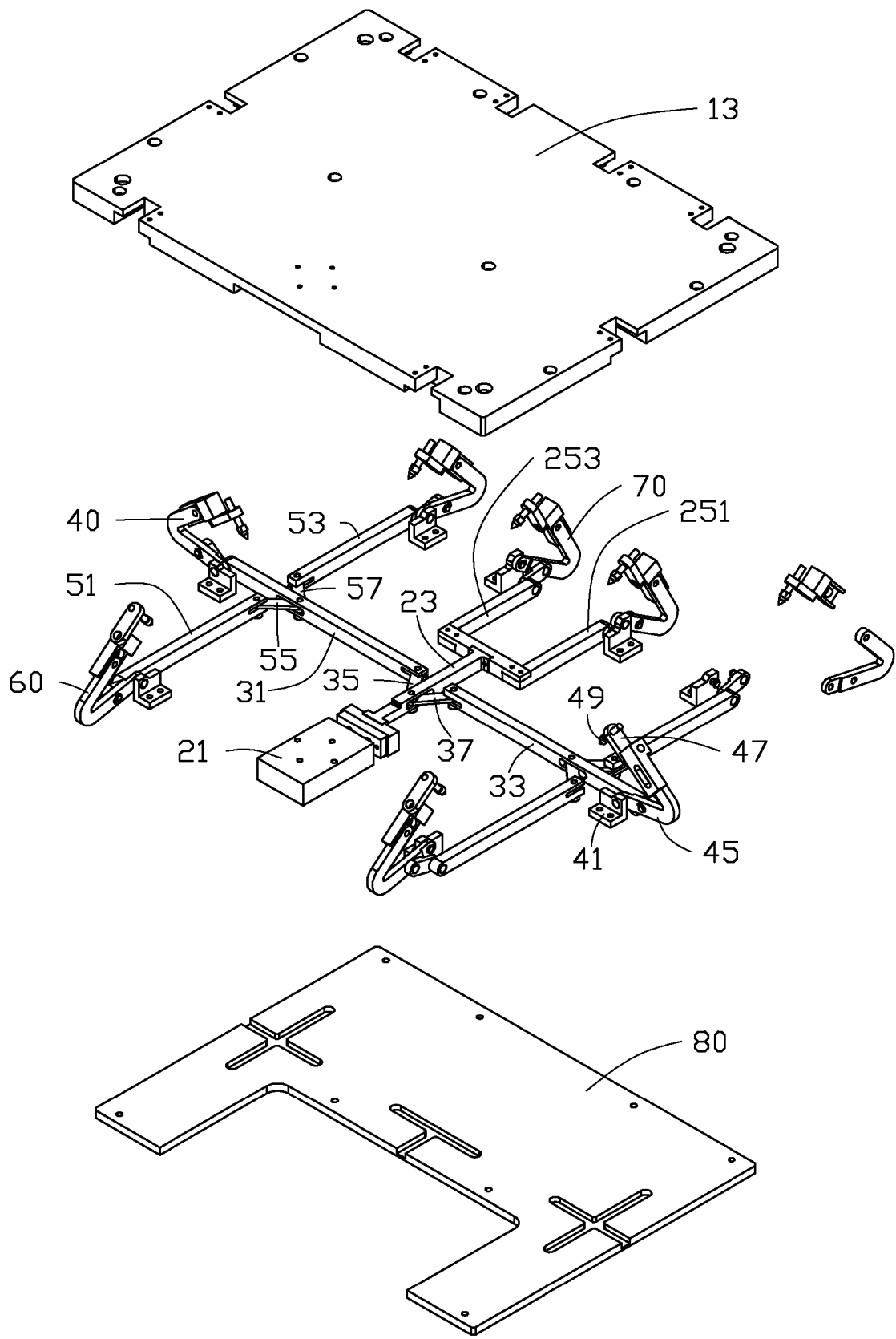
FIG. 5 is another exploded, isometric view of the positioning apparatus of FIG. 1.

FIGS. 3-5 illustrate that the driving assembly 20 can include a driver 21, a transfer rod 23, and a coupling frame 25. The driver 21 can be received in the first receiving portion 1112 of the first receiving groove 111. The transfer rod 23 can be coupled to the driver 21. A first end portion of the transfer rod 23 can be movably received in the first receiving portion 1112 of the first receiving groove 111. A second end portion of the transfer rod 23 can be movably received in the second receiving portion 1113 of the first receiving groove 111 (shown in FIG. 4). The first end portion of the transfer rod 23 can define a pivoting groove 231. The pivoting groove 231 can run through opposite sidewalls of the transfer rod 23.

The coupling frame 25 can be substantially U-shaped and coupled to the second end portion of the transfer rod 23 away from the driver 21. The coupling frame 25 can be movably received in the third receiving portion 1114. The coupling frame 25 can include a first coupling portion 251 and a second coupling portion 253 at a side away from the driving member 21. The first coupling portion 251 and the second coupling portion 253 can be parallel to each other.

The first pivoting assembly 30 can be link structure and include a first coupling rod 31, a second coupling rod 33, a third coupling rod 35, and a fourth coupling rod 37. The first coupling rod 31 and the second coupling rod 33 both can be movably received in the first guiding groove 113 and respectively positioned opposite sides of the transfer rod 23. The first coupling rod 31 and the second coupling rod 33 both can be perpendicular to the transfer rod 23. The first coupling rod 31 can define a pivoting groove 311. The second coupling rod 33 can define a pivoting groove 331. The pivoting groove 311 can run through opposite sidewalls of the first coupling rod 31. The pivoting groove 331 can run through opposite sidewalls of the second coupling rod 33.

The third coupling rod 35 and the fourth coupling rod 37 both can be movably received in the first receiving portion 1112 and respectively positioned at opposite sides of the transfer rod 23. A first end portion of the third coupling rod 35 can be pivotably coupled to the first coupling rod 31. A second end portion of the third coupling rod 35 can be movably received in the pivoting groove 231 and pivotably coupled to the transfer rod 23. A first end portion of the fourth coupling rod 37 can be pivotably coupled to the second coupling rod 33. A second end portion of the fourth coupling rod 37 can be movably received in the pivoting groove 231 and pivotably coupled to the transfer rod 23. In the illustrated embodiment, the second end portion of the third coupling rod 35 can be pivotably coupled to the second end portion of the fourth coupling rod 37. The second end portion of the third coupling rod 35, the second end portion of the fourth coupling rod 37, and the transfer rod 23 can be pivotably coupled together via a pin.

One of the first position assemblies 40 can be pivotably coupled to an end portion of the first coupling rod 31 away from the transfer rod 23. Another one of the first position assemblies 40 can be pivotably coupled to an end portion of the second coupling rod 33 away from the transfer rod 23. Each first position assembly 40 can include a fixing block 41, a first transfer rod 43, a second transfer rod 45, a coupling block 47, and a positioning member 49. The fixing blocks 41 of the first position assemblies 40 can be fixed to the mounting plate 10 can respectively received in the corresponding second receiving groove 117. A first end portion of the first transfer rod 43 can be received in the corresponding second receiving groove 117 and pivotably coupled to the corresponding one of the first coupling rod 31 and the second coupling rod 33. Thus, the first transfer rods 43 of the first position assemblies 40 can be respectively pivotably coupled to the first coupling rod 31 and the second coupling rod 33. A second end portion of the first transfer rod 43 can extend out of the corresponding second receiving groove 117.

The second transfer rod 45 can be substantially V-shaped and include a pivoting arm 451 and a coupling arm 453 coupled to the pivoting arm 451. The pivoting arm 451 and the coupling arm 453 can define an angle, cooperatively. The pivoting arm 451 can be pivotably coupled to the corresponding fixing block 41 and the corresponding first transfer rod 43.

In at least one embodiment, the pivoting arm 451 can be pivotably coupled to the an end of the first transfer rod 43 away from the mounting plate 10 and the corresponding fixing block 41 via pins. The coupling arm 453 can extend to a side of the second mounting surface 13 away from the first mounting surface 11. The coupling block 47 can be fixed to an end portion of the corresponding coupling arm 453 away from the pivoting arm 451. The positioning member 49 can be fixed to the coupling block 47 and substantially perpendicular to the coupling block 47. When the coupling arm 453 is rotated to be parallel to the second mounting surface 13, the positioning member 49 can be substantially perpendicular to the second mounting surface 13.

A structure of the second pivoting assembly 50 can be same as that of the first pivoting assembly 30. Each second pivoting assembly 50 can include a first coupling rod 51, a second coupling rod 53, a third coupling rod 55, and a fourth coupling rod 57. The first coupling rod 51 and the second coupling rod 53 can be received in the corresponding second guiding groove 115 and position at opposite sides of the corresponding one of the first coupling rod 31 and the second coupling rod 33. The third coupling rod 55 and the fourth coupling rod 57 can be partly received in the corresponding one of the pivoting groove 311 and the pivoting groove 331 and pivotably coupled to the corresponding one of the first coupling rod 31 and the second coupling rod 33. The third coupling rod 55 can be pivotably coupled to the first coupling rod 51. The fourth coupling rod 57 can be pivotably coupled to the second coupling rod 53.

A structure of both second position assembly 60 and the third position assembly 70 can be same as that of the first position assembly 40. The four second position assemblies 60 can be respectively coupled to the corresponding one of the first coupling rods 51 and the second coupling rods 53 of the second pivoting assemblies 50. The two third position assemblies 70 can be respectively coupled to the corresponding one of the first coupling portion 351 and the second coupling portion 253. For simply, introductions of the second position assemblies 60 and the third position assemblies 70 are omitted.

In the illustrated embodiment, the position apparatus 100 can further include a cover plate 80. The cover plate 80 can be fixed to the first mounting surface 11 of the mounting plate 10 and cover the driving assembly 20, the first pivoting assembly 30 and the second pivoting assemblies 50.

In use, the workpiece 200 can be put on the second mounting surface 13. The driver 21 can move the transfer rod 23 and the coupling frame 25 away from the driver 21. Thus, the first coupling rod 31 and the second coupling rod 33 can move away from the transfer rod 23. The first coupling rod 51 and the second coupling rod 53 can move away from the corresponding one of the first coupling rod 31 and the second coupling rod 33. The second transfer rod 45 can rotate until the positioning member 49 being inserted into the corresponding position hole 201. In the same, the second position assemblies 60 and the second position assemblies 70 can be inserted into the corresponding position hole 201 to position the workpiece 200. When the driver 21 move the transfer rod 23 and the coupling frame 25 toward the driver 21, the workpiece 200 can be released.

In at least one embodiment, the second pivoting assemblies 50, the second position assemblies 60, the third position assemblies 70, and the coupling frame 25 can be omitted. Then the workpiece 200 can be positioned only by the first position assemblies 40. A number of the second pivoting assembly 50 can be one or more than two and a number of the second position assembly 60 can be changed correspondingly. A number of the first coupling portion 251 and the second coupling portion 251 can be one or more than one and a number of the third position assembly 70 can be changed correspondingly. The positioning member 49 can be directly coupled to the second transfer rod 45 and then the coupling block 47 can be omitted. The second transfer rod 45 can be directly coupled to the mounting plate 10 and then the fixing block 41 can be omitted.

The embodiments shown and described above are only examples. Many details are often found in the art such as the other features of a positioning apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A positioning apparatus comprising:
   a mounting plate defining a first guiding groove;
   a driving assembly mounted on the mounting plate and comprising:
      a driver, and
      a transfer rod coupled to the driver;
   a first pivoting assembly comprising:
      a first coupling rod movably received in the first guiding groove,
      a second coupling rod movably received in the first guiding groove, the first coupling rod and the second coupling rod respectively positioned at opposite sides of the transfer rod,
      a third coupling rod pivotably coupled to the first coupling rod and the transfer rod, and
      a fourth coupling rod pivotably coupled to the second coupling rod and the transfer rod; and
   two first position assemblies respectively pivotably coupled to the first coupling rod and the second coupling rod, each first position assembly comprising:
      a first transfer rod,
      a second transfer rod pivotably coupled to the first transfer rod and the mounting plate, and
      a positioning member coupled to the second transfer rod;
   wherein the first transfer rod of one of the first position assemblies is pivotably coupled to the first coupling rod, the first transfer rod of another one of the first position assemblies is pivotably coupled to the second coupling rod.

2. The positioning apparatus of claim 1, wherein the transfer rod defines a pivoting groove, the pivoting groove runs through opposite sidewalls of the transfer rod, a first end portion of the third coupling rod is pivotably coupled to the first coupling rod, a second end portion of the third coupling rod is movably received in the pivoting groove and pivotably coupled to the transfer rod; a first end portion of the fourth coupling rod is pivotably coupled to the second coupling rod, a second end portion of the fourth coupling rod is movably received in the pivoting groove and pivotably coupled to the transfer rod.

3. The positioning apparatus of claim 2, wherein the second end portion of the third coupling rod is pivotably coupled to the second end portion of the fourth coupling rod.

4. The positioning apparatus of claim 1, wherein the mounting plate further defines at least one second guiding groove substantially perpendicular to the first guiding groove, the positioning apparatus further comprises at least one second pivoting assembly and at least two second position assemblies, the at least one second pivoting assembly comprises a first coupling rod, a second coupling rod, a third coupling rod, and a fourth coupling rod, the first coupling rod and the second coupling rod are respectively received in the second guiding groove, the third coupling rod of the at least one second pivoting assembly is pivotably coupled to the first coupling rod of the at least one second pivoting assembly and the first coupling rod of the first pivoting assembly, the fourth coupling rod of the at least one second pivoting assembly is pivotably coupled to the second coupling rod of the at least one second pivoting assembly and the first coupling rod of the first pivoting assembly, the at least two second position assemblies are respectively pivotably coupled to the first coupling rod of the at least one second pivoting assembly and the second coupling rod of the at least one second pivoting assembly.

5. The positioning apparatus of claim 1, wherein the driving assembly further comprises a coupling frame coupled to the transfer rod, the coupling frame comprises a first coupling portion and a second coupling portion, the positioning apparatus further comprise two third position assemblies respectively coupled to the first coupling portion and the second coupling portion.

6. The positioning apparatus of claim 5, wherein a structure of each position assembly is same as that of each first position assembly.

7. The positioning apparatus of claim 5, wherein the mounting plate further defines a first receiving groove, the first receiving groove comprises a first receiving portion, a second receiving portion, and a third receiving portion, the second receiving portion is positioned between the first receiving portion and the third receiving portion and communicate with the first receiving portion and the third receiving portion, the driver is received in the first receiving portion, the second receiving portion crosses over the first guiding groove and receives the transfer rod, the coupling frame is received in the third receiving portion.

8. The positioning apparatus of claim 1, wherein the mounting plate further defines two second receiving grooves positioned at opposite ends of the first guiding groove, the first transfer rods of the first position assemblies are partly received in the corresponding second receiving groove.

9. The positioning apparatus of claim 8, wherein the first position assembly further comprises a fixing block fixed to the mounting plate and received in the corresponding second receiving groove, the second transfer rod and the first transfer rod are pivotably coupled to the fixing block.

10. The positioning apparatus of claim 9, wherein the first position assembly further comprises a coupling block fixed to the second transfer rod, the positioning member is fixed to the coupling block and substantially perpendicular to the coupling block.

11. The positioning apparatus of claim 10, wherein the second transfer rod is substantially V-shaped and comprises a pivoting arm and a coupling arm coupled to the pivoting arm, the pivoting arm is pivotably coupled to the corresponding fixing block and the corresponding first transfer rod, the coupling block is fixed to the coupling arm.

12. The positioning apparatus of claim 1 further comprising:
a cover plate coupled to the mounting plate and cover the driving assembly and the first pivoting assembly.

13. A positioning apparatus comprising:
a mounting plate defining a first guiding groove;
a driving assembly mounted on the mounting plate and comprising:
a driver, and
a transfer rod coupled to the driver;
a first pivoting assembly comprising:
a first coupling rod movably received in the first guiding groove and pivotably coupled to the transfer rod, and
a second coupling rod movably received in the first guiding groove and pivotably coupled to the transfer rod; and
two first position assemblies respectively pivotably coupled to the first coupling rod and the second coupling rod.

14. The positioning apparatus of claim 13, wherein the first pivoting assembly further comprises:
a third coupling rod pivotably coupled to the first coupling rod and the transfer rod, and
a fourth coupling rod pivotably coupled to the second coupling rod and the transfer rod.

15. The positioning apparatus of claim 14, wherein each first position assembly comprises:
a first transfer rod,
a second transfer rod pivotably coupled to the first transfer rod and the mounting plate, and
a positioning member coupled to the second transfer rod;
wherein the first transfer rod of one of the first position assemblies is pivotably coupled to the first coupling rod, the first transfer rod of another one of the first position assemblies is pivotably coupled to the second coupling rod.

16. The positioning apparatus of claim 15, wherein the first position assembly further comprises a fixing block fixed to the mounting plate, the second transfer rod and the first transfer rod are pivotably coupled to the fixing block.

17. The positioning apparatus of claim 16, wherein the first position assembly further comprises a coupling block fixed to the second transfer rod, the positioning member is fixed to the coupling block and substantially perpendicular to the coupling block.

18. The positioning apparatus of claim 17, wherein the second transfer rod is substantially V-shaped and comprises a pivoting arm and a coupling arm coupled to the pivoting arm, the pivoting arm is pivotably coupled to the corresponding fixing block and the corresponding first transfer rod, the coupling block is fixed to the coupling arm.

19. The positioning apparatus of claim 13 further comprising:
a cover plate coupled to the mounting plate and cover the driving assembly and the first pivoting assembly.

20. The positioning apparatus of claim 13, wherein the driving assembly further comprises a coupling frame coupled to the transfer rod, the coupling frame comprises at least one first coupling portion, the positioning apparatus further comprise at least one third position assembly coupled to the at least one first coupling portion.

* * * * *